United States Patent
Gale et al.

(10) Patent No.: US 8,872,471 B2
(45) Date of Patent: Oct. 28, 2014

(54) VARIABLE OUTPUT CURRENT BATTERY CHARGER AND METHOD OF OPERATING SAME

(75) Inventors: Allan Roy Gale, Livonia, MI (US); Paul Theodore Momcilovich, Tecumseh, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 13/272,669

(22) Filed: Oct. 13, 2011

(65) Prior Publication Data

US 2013/0093391 A1    Apr. 18, 2013

(51) Int. Cl.
- *H02J 7/14* (2006.01)
- *H02J 3/14* (2006.01)
- *B60L 9/00* (2006.01)
- *B60L 11/18* (2006.01)
- *H02J 7/04* (2006.01)
- *B60L 11/14* (2006.01)

(52) U.S. Cl.
CPC ............... *H02J 7/04* (2013.01); *B60L 11/1816* (2013.01); *B60L 11/1868* (2013.01); *H02J 7/045* (2013.01); *B60L 11/14* (2013.01); *Y02T 10/7005* (2013.01); *B60L 11/1874* (2013.01)
USPC .................. 320/104; 307/31; 701/22

(58) Field of Classification Search
USPC ........................ 320/104, 109; 307/31; 701/22
See application file for complete search history.

(56) References Cited

U.S. PATENT DOCUMENTS

| | | | | |
|---|---|---|---|---|
| 4,433,278 A | * | 2/1984 | Lowndes et al. | 320/116 |
| 4,435,675 A | * | 3/1984 | Adams | 320/125 |
| 5,345,761 A | * | 9/1994 | King et al. | 60/274 |
| 6,215,281 B1 | | 4/2001 | Koch | |
| 6,331,762 B1 | * | 12/2001 | Bertness | 320/134 |
| 7,629,774 B2 | * | 12/2009 | Nordlof | 320/156 |
| 8,253,376 B2 | * | 8/2012 | Gale et al. | 320/109 |
| 8,359,132 B2 | * | 1/2013 | Laberteaux et al. | 701/22 |
| 8,478,452 B2 | * | 7/2013 | Pratt et al. | 700/297 |
| 2004/0004458 A1 | | 1/2004 | Tanaka et al. | |
| 2006/0012338 A1 | | 1/2006 | Etzold | |
| 2008/0180058 A1 | * | 7/2008 | Patel et al. | 320/109 |
| 2009/0200988 A1 | * | 8/2009 | Bridges et al. | 320/137 |
| 2011/0166732 A1 | * | 7/2011 | Yu et al. | 701/22 |
| 2011/0218698 A1 | * | 9/2011 | Bissontz | 701/22 |
| 2013/0073113 A1 | * | 3/2013 | Wang et al. | 701/1 |

FOREIGN PATENT DOCUMENTS

| | | | |
|---|---|---|---|
| GB | 2080642 A | * | 2/1982 |
| JP | 2010041891 A | | 2/2010 |
| WO | 03047066 A1 | | 6/2003 |

OTHER PUBLICATIONS

Wang, Jin, Charging Strategy Studies for PHEV Batteries Based on Power Loss Model, SAE International, 2010-01-1238, Apr. 12, 2010, Columbus, Ohio, pp. 1-8.

* cited by examiner

*Primary Examiner* — M'baye Diao
(74) *Attorney, Agent, or Firm* — David B. Kelley; Brooks Kushman P.C.

(57) ABSTRACT

A vehicle includes a battery charger system arranged to charge a traction battery. The battery charger system receives current from a power distribution system remote from the vehicle and outputs the current to the traction battery at a series of magnitudes to characterize a charge efficiency profile of the battery charger and power distribution systems. The battery charger system then charges the traction battery according to the charge efficiency profile.

10 Claims, 2 Drawing Sheets

VARIABLE OUTPUT CURRENT BATTERY CHARGER AND METHOD OF OPERATING SAME

TECHNICAL FIELD

This disclosure relates to processes, methods, algorithms and systems for charging automotive vehicle batteries.

BACKGROUND

An alternatively powered vehicle such as a battery electric vehicle, plug-in hybrid electric vehicle, etc. typically includes a power storage unit (e.g., traction battery) used to store energy for moving the vehicle. Energy stored by this power storage unit may be replenished by electrically connecting a charging system associated with the power storage unit with a power distribution circuit remote from the vehicle (e.g., plugging in the vehicle). The cost to charge the power storage unit may depend on the time of day during which charging is performed and the efficiency of the charging operation.

SUMMARY

A vehicle may include a traction battery and a battery charger system. The battery charger system may receive current from a power distribution system remote from the vehicle, output the current to the traction battery at a series of magnitudes to characterize a charge efficiency profile of the battery charger and power distribution systems, and charge the traction battery based on the charge efficiency profile.

A battery charger system may include a controller arrangement that receives energy from a power distribution circuit defined by wiring connecting a power source remote from a vehicle and the controller arrangement and that outputs a charge current at a magnitude that depends on a resistance of the wiring.

A battery charger system may receive current from a power distribution system remote from the vehicle, output the current to a traction battery at a series of magnitudes to characterize a charge efficiency profile of the battery charger and power distribution systems, and charge the traction battery based on the charge efficiency profile.

DETAILED DESCRIPTION

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

A charger of an electrified vehicle has a peak efficiency when transferring energy from an external source to the battery. This peak efficiency may vary depending on the design of the charger but is typically about 90%. The charger, however, is only one of the subsystems enabled during charge. Other vehicle subsystems, such as cooling subsystems, etc., may shift the peak efficiency higher or lower depending on the specific design. Additionally, the electrical supply system providing power to the vehicle has losses that impact peak efficiency. Performing the charge operation at or near the system peak efficiency may minimize the cost associated with charging the battery.

Figure 1:
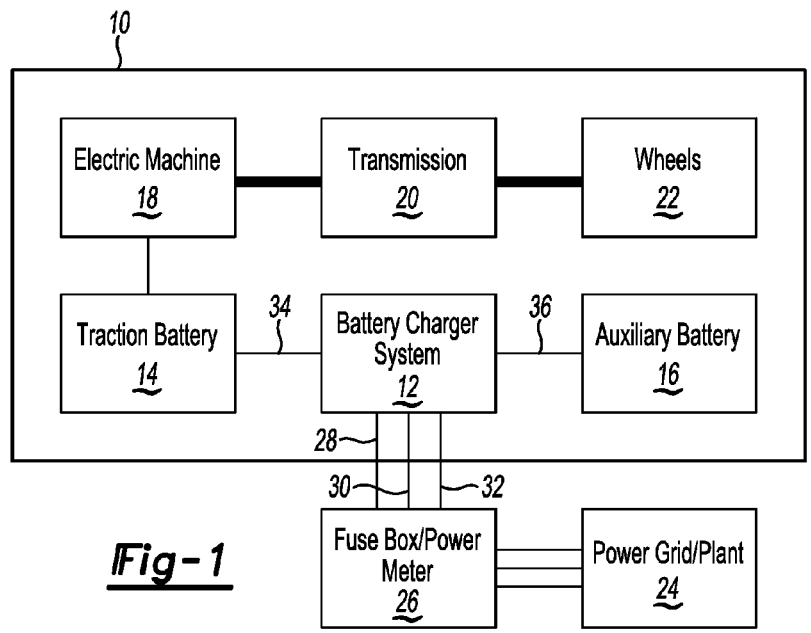
FIG. 1 is a block diagram of an alternatively powered vehicle.

Referring to FIG. 1, an automotive vehicle 10 may include a battery charger system 12, traction battery 14, and auxiliary battery 16. The vehicle 10 may further include an electric machine 18, transmission 20, and wheels 22. The battery charger system 12 is electrically connected with the traction and auxiliary batteries 14, 16 (as indicated by thin line). The traction battery 14 is further electrically connected with electric machine 18 (as indicated by thin line). The transmission 20 is mechanically connected with electric machine 18 and wheels 22. Other vehicle arrangements, such as a plug-in hybrid electric vehicle, etc., are also contemplated.

The battery charger system 12 may be electrically connected with a power grid/plant 24 via a fuse box/power meter 26 (as indicated by thin line). That is, the vehicle 10 may be plugged in to a wall outlet (not shown) of a residential or commercial building. The power cord and associated wiring electrically connecting the battery charger system 12 to the wall outlet and the wiring electrically connecting the wall outlet and fuse box 26 is represented by a line 28, neutral 30, and ground 32. Hence, electrical energy from the power grid 24 may pass through the fuse box 26 and to the battery charger system 12.

The battery charger system 12 may charge either or both of the traction and auxiliary batteries 14, 16. In the example of FIG. 1, the battery charger system 12 has a high voltage output 34 electrically connected with the traction battery 14 and a low voltage output 36 electrically connected with the auxiliary battery 16. The battery charger system 12, in other examples however, may charge only the traction battery 14. A plug-in hybrid electric vehicle, for example, may include a battery charger system with a high voltage output electrically connected with a traction battery, and a combustion engine arranged to drive an alternator electrically connected with an auxiliary battery.

The electric machine 18 is arranged to receive electrical energy from the traction battery 14 and convert this electrical energy to mechanical energy. This mechanical energy is used to drive the transmission 20 and wheels 22 to move the vehicle 10. The transmission 20, in other examples, may also be driven by a combustion engine, fuel cell, etc.

The net efficiency, $\eta_{charge}$, of the systems/subsystems affecting the charge operation may be given by $$\eta_{charge} = \frac{P_{HVbattery}}{P_{ACline} + \Delta P_{loss\_ACline}} \quad (1)$$

where $P_{HVbattery}$ is the power output by the battery charger system 12 to the traction battery 14, $P_{ACline}$, is the power input to the battery charger system 12, and $\Delta P_{loss\_Annie}$ is the I²R losses in the line 28 and neutral 30. Put another way (assuming unity power factor), $$P_{HVbattery} = I_{HVbattery} * V_{HVbattery} \quad (2)$$

$$P_{acline} = I_{ACline\_input} * V_{ACline\_input} \quad (3)$$

$$\Delta P_{loss\_ACline} = I_{ACline\_input}^2 * R_{ACline} \quad (4)$$

$$R_{ACline} = \frac{\Delta V_{ACline\_input}}{I_{ACline\_input\_test}} \quad (5)$$

where $I_{HVbattery}$ is the charge current provided by the battery charger system 12 to the traction battery 14, $V_{HVbattery}$ is the voltage of the traction battery 14, $I_{ACline\_input}$ is the current input to the battery charger system 12, $V_{ACline\_input}$ is the voltage input to the battery charger system 12, and $\Delta V_{ACline\_input}$ is the difference in voltage between the line 28 and neutral 30 before and after a constant current, $I_{ACline\_input\_test}$, is drawn by the battery charger system 12. $I_{ACline\_input\_test}$ can be any reasonable current capable of being drawn by the battery charger system 12. Hence, $R_{Anine}$ represents the resistance as seen at the input of the battery charger system 12 from the power grid 24—the dominant factor being the resistance of the line 28 and neutral 30. Each of these parameters may be measured via known sensors provided with the battery charger system 12. For example, the battery charger system 12 may include current and voltage sensors (not shown) operatively arranged with the high voltage output 34, a current sensor (not shown) operatively arranged with the line 28, etc. (Equations (2)-(5) may be modified as known in the art to account for power factors other than unity.)

The efficiency of the battery charger system 12, as mentioned above, may be affected by other systems/subsystems operable during battery charge. Hence, the battery charger system 12 may evaluate its efficiency within the context of the systems/subsystems to which it is electrically connected according to (1) and select a charge current for the traction battery 14 that maximizes charge efficiency while meeting any other imposed constraints such as charge duration, etc.

Figure 2:
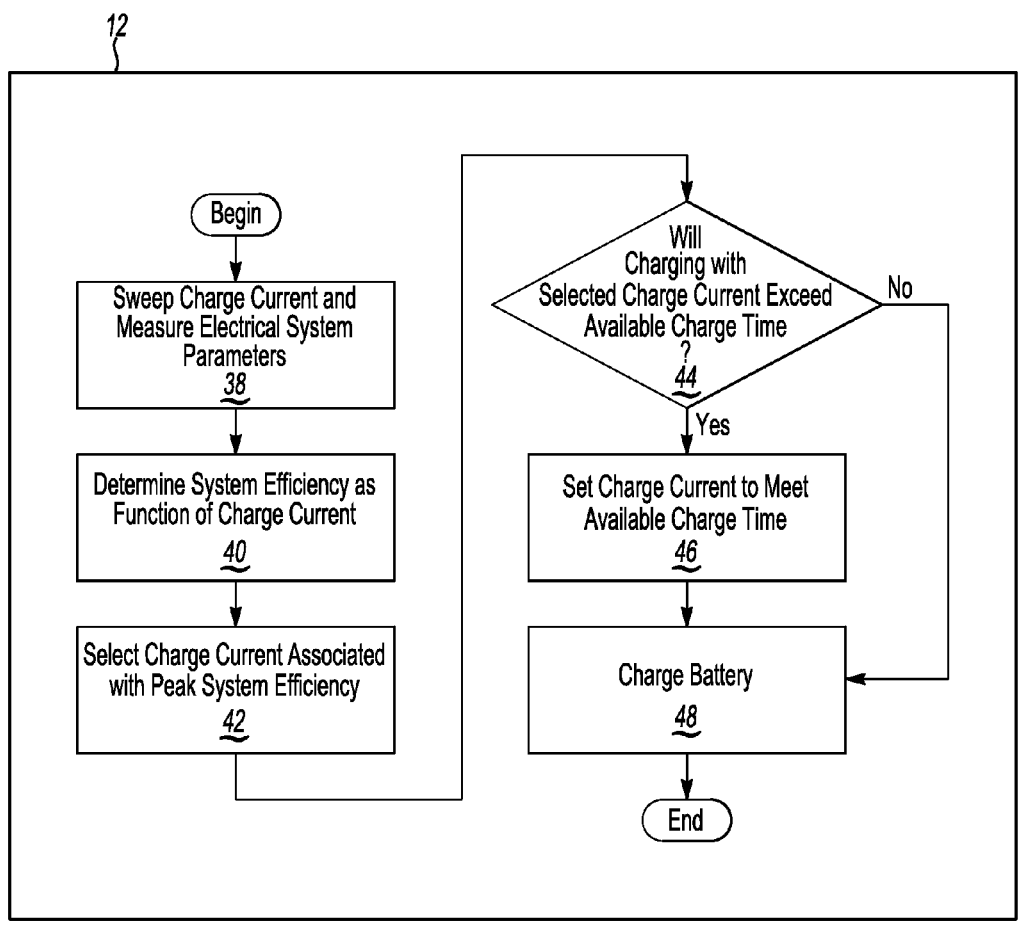
FIG. 2 is a flowchart illustrating an algorithm for charging a vehicle battery.
Figure 3:
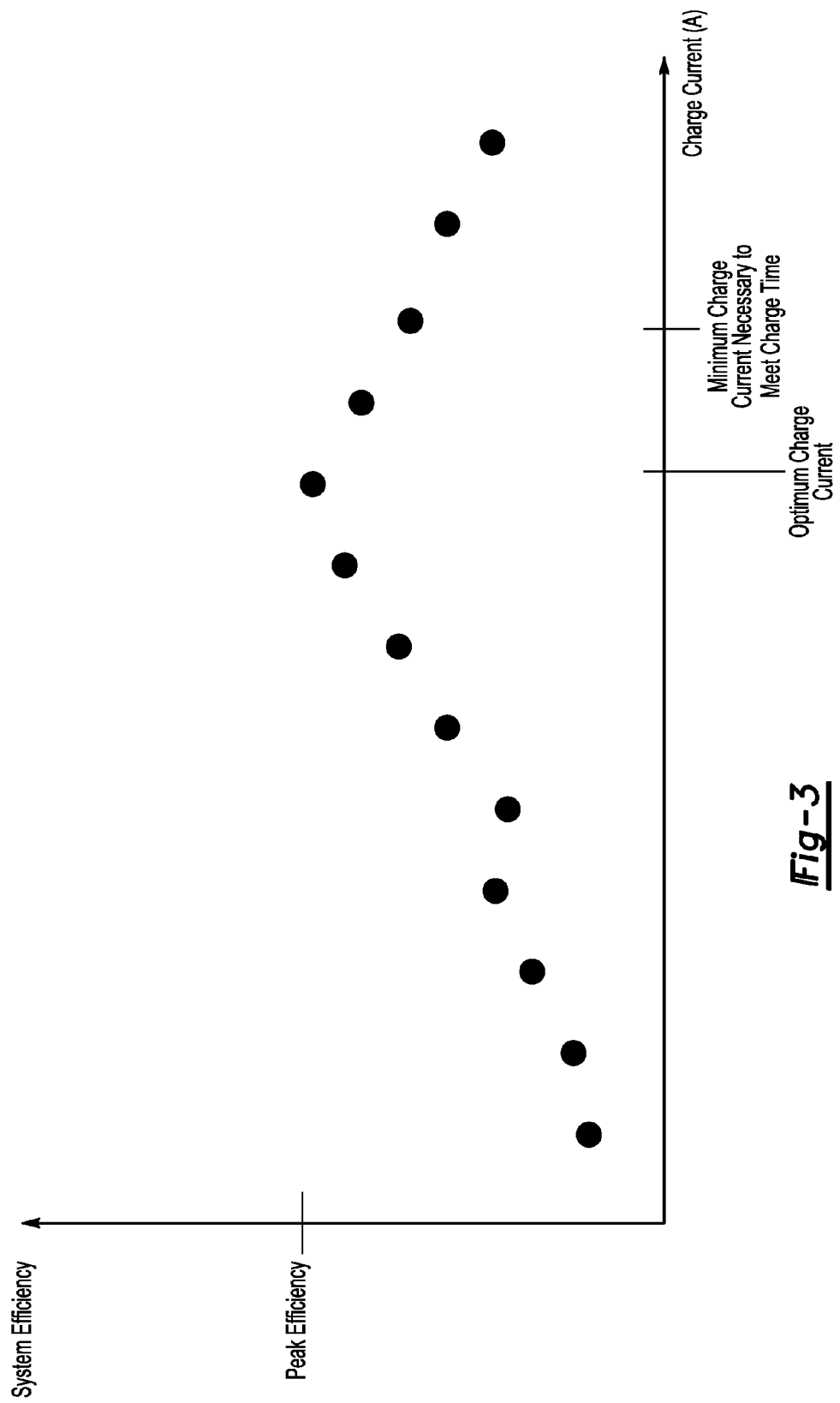
FIG. 3 is a plot of charge current versus charge operation efficiency.

Referring to FIG. 2, a charge current for a high-voltage battery may be swept through some predetermined range and electrical system parameters associated therewith may be measured at operation 38. The battery charger system 12, for example, may operate to output a series of charge currents for the traction battery 14. For each charge current, the battery charger system 12 may measure the associated parameters detailed in equations (2)-(5). At operation 40, system efficiency may be determined as a function of charge current. For example, the battery charger system 12 may determine the efficiency associated with each charge current according to (1) using the parameters measured at operation 38. Referring to FIG. 3, the battery charger system 12 may operate, for a brief time, to output 13 different charge currents to the traction battery 14 to characterize the efficiency profile associated with the charge operation. Any number of test currents/current sweep schemes, however, may be used. System efficiency may then be reported as a function of charge current.

Referring again to FIG. 2, the charge current associated with peak system efficiency may be selected at operation 42. The battery charger system 12 may identify, for example, the charge current corresponding to the maximum system efficiency. Referring to FIG. 3, the optimum charge current has been labeled. That is, the charge current yielding peak system efficiency has been identified.

Referring again to FIG. 2, it is determined whether charging with the identified battery charge current will exceed the available charge time at operation 44. Assuming, for example, that the charge current identified at operation 42 is 4 A (with an associated system peak efficiency of 90%), a charge rate of 4 A-hrs/hr may result. If the traction battery 14 needs to receive 16 A-hrs of capacity in order to achieve a target state of charge, the associated charge time at the peak efficiency is 4 hours. If, however, the available charge time is 3 hours, the traction battery will not achieve its target state of charge at the expiration of the available charge time.

Any known/suitable technique may be used to determine the capacity required to raise the state of charge of the battery from a given value to a target value. For example, if the initial state of charge is 50% and the maximum capacity of the battery is 32 A-hrs, then 16 A-hrs is required to raise the state of charge from 50% to a target of 100% assuming the state of charge is proportional to the capacity of the battery.

Any known/suitable technique may be used to determine the available charge time. A driver of the vehicle 10, for example, may provide input specifying the available charge time. Alternatively, a fixed available charge time may be set by the manufacturer of the vehicle 10. Learning algorithms may also be used to estimate the available charge time given usage patterns of the vehicle 10, etc.

Returning to operation 44, if yes, the charge current may be set to meet the available charge time at operation 46. Referring again to FIG. 3, the minimum charge current necessary to charge the traction battery 14 to the target state of charge within the available charge time has been labeled. This minimum current value, in one example, may be found by dividing the A-hrs necessary to achieve the target state of charge by the available charge time. Other methods, however, are also contemplated. Of the charge currents capable of meeting the available charge time, the minimum charge current is the most efficient in this example. Hence, the charge current for the traction battery 14 may be set to the identified minimum value. Values greater than the minimum value may also be selected. Charging at these values, however, will result in a less efficient charge cycle according to this example. In other examples, a charge current greater than the minimum may be the most efficient.

At operation 48, the battery is charged with the selected charge current. The battery charger system 12 may, for example, charge the traction battery with the minimum charge current necessary to meet the charge time illustrated in FIG. 3.

Returning to operation 44, if no, the charge current is kept at the optimum charge current. In these circumstances, the optimum charge current is of sufficient magnitude to raise the state of charge of the traction battery 14 to the target within the time allotted. The algorithm then proceeds to operation 48. In other examples, operations 44, 46 may, of course, be omitted.

Referring again to FIG. 1, not shown is a DC/DC converter, alternator, etc. that during normal vehicle drive operation may provide energy to the auxiliary battery 16 and the electrical subsystems connected therewith. In most charge cases, the auxiliary battery 16 will have already been fully charged by the DC/DC converter and may not require additional energy. If, however, there is a need for the auxiliary battery 16 to be charged, equation (1) may be modified using known techniques to consider power directed to the auxiliary battery 16. Considering the most common case where the auxiliary battery 16 is near or at full charge, any power being supplied to the auxiliary battery 16 is power used by loads connected therewith. These loads reduce the amount of power available to charge the traction battery 14 and can be thought of as charge system losses. Equation (1) as written considers these losses.

Conditions may change during charging of the traction battery 14 resulting in a change in the system peak efficiency. Due to these changes, it may be desirable to repeat the algorithm of FIG. 2 periodically during charging. As the traction battery voltage increases during charge, for example, the AC line voltage, resistance, etc. may change, which may shift the optimal efficiency point. As a result, the casual observer may observe a charge system changing its charge rate as AC line resistance increases if implementing certain of the processes, methods, etc. detailed herein.

The losses that increase exponentially with power level noticeably impact the ideal lower cost operating point of the system when implemented on a vehicle. The exponential losses within the charger may be small relative to other charger losses. A maximum charge rate based on available power from the AC line may be an acceptable choice for operation. The addition of charge and battery cooling system may add exponentially increasing power losses with increasing charge power levels resulting in a selection of a less than maximum charge rate. With the further addition of the wire $I^2R$ losses in the line 28 and neutral 30, there will be an additional reduction in the ideal charge rate. Hence, if a charge system considers wire $I^2R$ losses when selecting its charge rate, increasing the length (resistance) of the wires will result in the charge system selecting a lower charge rate (assuming there is sufficient charge time to complete the charge operation at the lower charge rate.)

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. For example, the line 28 and neutral 30 were described within the context of a 120 V AC distribution system common to the United States. It is also contemplated, however, that the disclosure herein applies to other AC voltage systems. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery; and
a battery charger system configured to receive current from a power distribution system remote from the vehicle, output the current to the traction battery at a series of magnitudes to characterize a charge efficiency profile of the battery charger and power distribution systems, and output current at one of the series of magnitudes that yields maximum efficiency according to the charge efficiency profile to charge the traction battery.

2. The vehicle of claim 1 wherein characterizing the charge efficiency profile of the battery charger and power distribution systems includes measuring electrical system parameters associated with the power distribution system.

3. The vehicle of claim 2 wherein the parameters are indicative of a resistance of the power distribution system.

4. The vehicle of claim 1 further comprising an electric machine configured to transform electrical energy from the traction battery to mechanical energy to move the vehicle.

5. A battery charger system comprising:
a controller arrangement configured to receive energy from a power distribution circuit defined by wiring connecting a power source remote from a vehicle and the controller arrangement, to output a current at a series of magnitudes, to measure electrical system parameters associated with the power distribution circuit indicative of the resistance of the wiring at each of the series of magnitudes, to generate a charge efficiency profile based on the parameters, and to output a charge current at a magnitude that depends on a resistance of the wiring.

6. The system of claim 5 wherein the magnitude that depends on the resistance of the wiring corresponds to a maximum of the charge efficiency profile.

7. The system of claim 5 wherein the magnitude further depends on an available charge time.

8. A method of operating a battery charger system of a vehicle comprising:
receiving current from a power distribution system remote from the vehicle;
outputting the current to a traction battery at a series of magnitudes to characterize a charge efficiency profile of the battery charger and power distribution systems; and
outputting current at one of the series of magnitudes that yields maximum efficiency according to the charge efficiency profile to charge the traction battery.

9. The method of claim 8 wherein characterizing the charge efficiency profile of the battery charger and power distribution systems includes measuring electrical system parameters associated with the power distribution system.

10. The method of claim 9 wherein the parameters are indicative of a resistance associated with power distribution system.

* * * * *